United States Patent
Lu et al.

(10) Patent No.: US 6,580,924 B1
(45) Date of Patent: *Jun. 17, 2003

(54) WIRELESS CO-TENANT BASE STATION

(75) Inventors: Priscilla M. Lu, San Carlos, CA (US); Pi-Hui Chao, Foster City, CA (US)

(73) Assignee: Interwave Communications International, Ltd., Hamilton (BM)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/287,308

(22) Filed: Apr. 7, 1999

Related U.S. Application Data

(63) Continuation of application No. 09/231,329, filed on Jan. 13, 1999, which is a continuation-in-part of application No. 09/229,771, filed on Jan. 13, 1999, which is a continuation-in-part of application No. 09/049,606, filed on Mar. 27, 1998, which is a continuation-in-part of application No. 08/927,353, filed on Sep. 11, 1997, which is a continuation-in-part of application No. 08/435,709, filed on May 4, 1995, now Pat. No. 5,734,699, which is a continuation-in-part of application No. 08/434,598, filed on May 4, 1995, now Pat. No. 5,734,979.

(60) Provisional application No. 60/071,584, filed on Jan. 15, 1998, and provisional application No. 60/071,075, filed on Jan. 15, 1998.

(51) Int. Cl.[7] .............................. H04B 1/38; H04M 1/00
(52) U.S. Cl. ......................................... 455/560; 455/561
(58) Field of Search ................................ 455/426, 552, 455/560, 561, 422, 553

(56) References Cited

U.S. PATENT DOCUMENTS

| | | | |
|---|---|---|---|
| 5,212,822 A | | 5/1993 | Fukumine et al. ......... 455/33.1 |
| 5,402,470 A | * | 3/1995 | DeVaney ..................... 455/561 |
| 5,457,734 A | | 10/1995 | Eryaman et al. .............. 379/58 |
| 5,555,260 A | * | 9/1996 | Rinnback et al. ............. 455/72 |
| 5,682,416 A | * | 10/1997 | Schmidt et al. ............... 455/63 |
| 5,822,693 A | | 10/1998 | Harrison ...................... 455/432 |

\* cited by examiner

*Primary Examiner*—Nguyen T. Vo
(74) *Attorney, Agent, or Firm*—Dorsey & Whitney LLP

(57) ABSTRACT

A base transceiver station (BTS) includes a first transceiver configured to communicate with a first mobile station on a first frequency band, and a second transceiver configured to communicate with a second mobile station on a second frequency band. These bands can be, for example, 900 Mhz and 1800 Mhz frequency bands. The BTS includes a processor configured to instruct the first transceiver to receive inbound information from the first mobile station and to transmit outbound information to the first mobile station and to instruct the second transceiver to receive inbound information from the second mobile station and to transmit outbound information to the second mobile station. A trunk module is coupled to the processor and configured to communicate the first information and the second information with a base station controller (BSC). The base station controller is coupled to the BTS and configured to communicate the inbound information and outbound information with the BTS. In one embodiment, a time division multiplexing technique is used to communicate the inbound information and outbound information between the BTS and BSC. Advantages of the invention include the ability to incorporate multiple transceivers communicating over multiple frequency bands in a single BTS. This allows easier placement of the various transceivers in a single location and improves cellular service to mobile stations.

19 Claims, 4 Drawing Sheets

WIRELESS CO-TENANT BASE STATION

REFERENCE TO RELATED APPLICATIONS

This application is a continuation of U.S. Ser. No. 09/229,771 filed on Jan. 13, 1999, claiming priority to U.S. Prov. No. 60/071,584 filed on Jan. 15, 1998; a continuation in part of U.S. Ser. No. 09/049,606 filed on Mar. 27, 1998, which is a continuation of U.S. Ser. No. 08/434,598 filed on May 4, 1995, now U.S. Pat. No. 5,734,979; a continuation in part of U.S. Ser. No. 08/927,353 filed on Sep. 11, 1997, which is a continuation-in-part of U.S. Ser. No. 08/435,709 filed on May 4, 1995, now U.S. Pat. No. 5,734,699; and a continuation in part of U.S. Ser. No. 09/231,329 filed on Jan. 13, 1999, claiming priority to U.S. Prov. No. 60/071,075 filed on Jan. 15, 1998, all incorporated herein by reference.

FIELD

The present invention relates to a wireless co-tenant base station. In particular, the base station is capable of providing multiple radios to communicate with different mobile stations on different frequency bands or protocols.

BACKGROUND

Existing cellular base stations are configured to communicate with one type of mobile station. The radios that are incorporated in to the base stations are designed to communicate with one type of mobile station. For example, one type of radio is configured to communicate with a 900 MHz frequency band mobile station and another type of radio is configured to communicate with an 1800 Mhz frequency band mobile station. If a cellular service provider wants to serve both types of mobile stations, the service provider would need to install a 900 Mhz base station and an 1800 Mhz base station.

Therefore, a limitation of existing cellular base stations is that they are not equipped to provide service to multiple types of mobile stations.

What is needed is a cellular base station that can provide service to multiple types of mobile stations.

SUMMARY

The invention overcomes the identified problems and provides a base station that can serve multiple types of mobile stations. A base transceiver station (BTS) according to an exemplary embodiment includes a first transceiver configured to communicate with a first mobile station on a first frequency band, and a second transceiver configured to communicate with a second mobile station on a second frequency band. These bands can be, for example, 900 MHz and 1800 MHz frequency bands. The BTS includes a processor configured to instruct the first transceiver to receive inbound information from the first mobile station and to transmit outbound information to the first mobile station and to instruct the second transceiver to receive inbound information from the second mobile station and to transmit outbound information to the second mobile station. A trunk module is coupled to the processor and configured to communicate the first information and the second information with a base station controller (BSC). The BSC is coupled to the BTS and configured to communicate the inbound information and outbound information with the BTS. In one embodiment, a time division multiplexing technique is used to communicate the inbound information and outbound information between the BTS and BSC.

In another embodiment, the first information includes first voice/data information and first control information and the second information includes second voice/data information and second control information. The control information is associated with an Abis communication protocol between the BTS and BSC and is multiplexed over a single Abis link between the BTS and BSC.

Another embodiment of the base transceiver station includes a third transceiver configured to communicate with a third mobile station over a third frequency band. This band can be, for example, a 1900 MHz frequency band. The processor is configured to instruct the third transceiver to receive inbound information from the third mobile station and to transmit outbound information to the third mobile station. The trunk module is configured to communicate the third information with the BSC. The time division multiplexing technique is used to communicate the third inbound information and third outbound information between the BTS and BSC.

Advantages of the invention include the ability to incorporate multiple transceivers in a BTS for communicating on multiple frequency bands. This allows easier placement of the various transceivers in a single location and improves cellular service to mobile stations.

BRIEF DESCRIPTION OF THE FIGURES

Additional advantages of the invention will become apparent upon reading the following detailed description and upon reference to the drawings, in which.

DETAILED DESCRIPTION

Exemplary embodiments are described with reference to specific configurations. Those skilled in the art will appreciate that various changes and modifications can be made to the exemplary embodiments while remaining within the scope of the claims. For example, the exemplary embodiments are described with reference to the Global Systems for Mobile Communications (GSM) protocol. However, any communication protocol and a wide range of frequencies can be used in the invention.

A. THE CELLULAR NETWORK

Figure 1:
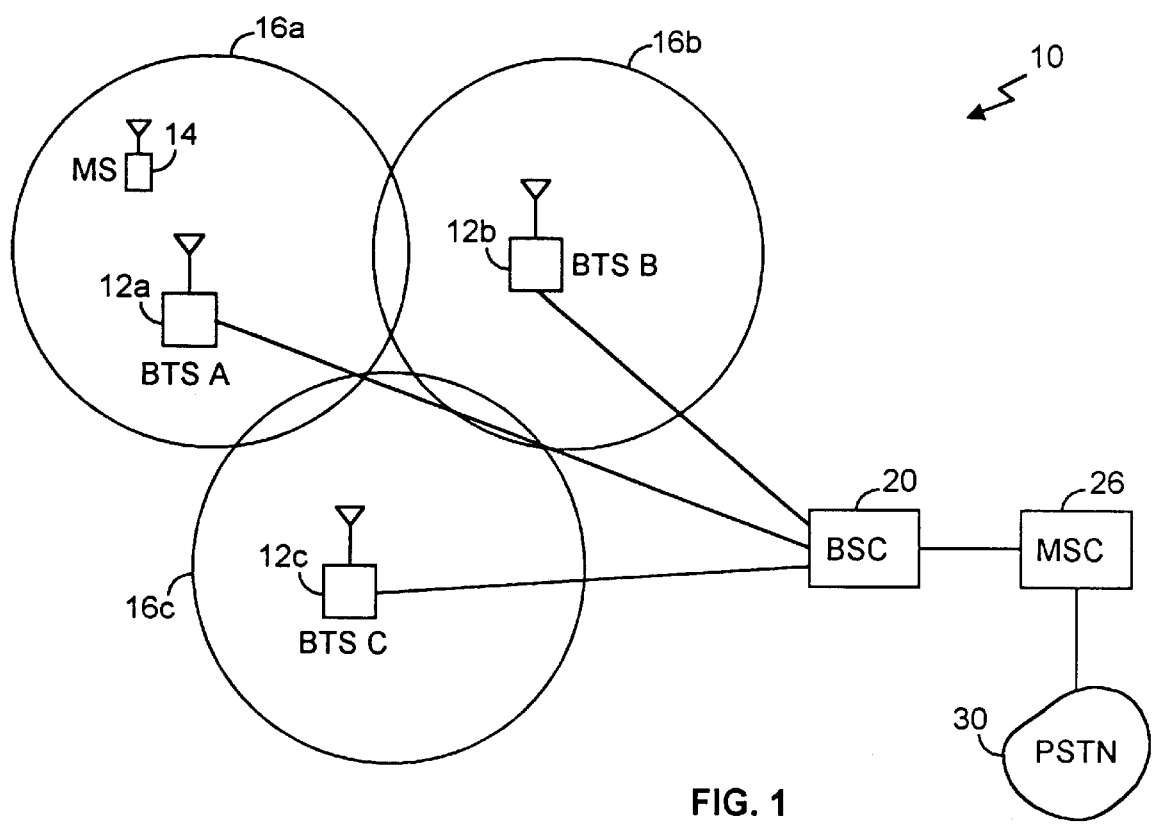
FIG. 1 depicts a cellular network according to the prior art.
Figure 2A:
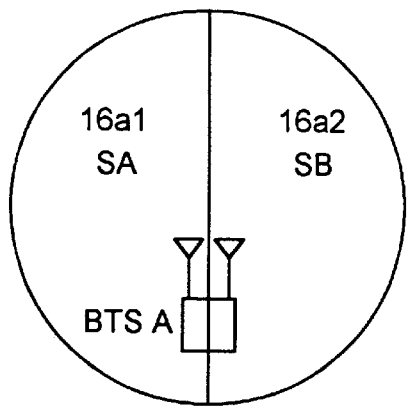
FIGS. 2A–B depict a geographically sectorized base transceiver station according to the prior art.
Figure 2B:
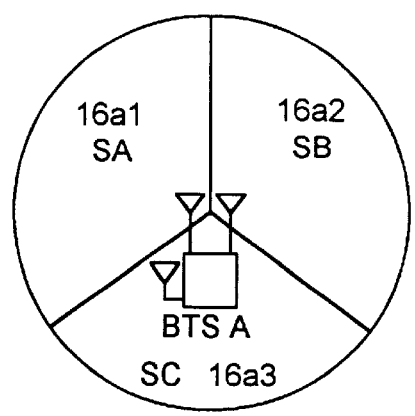

FIGS. 1 and 2A–B depict a conventional cellular network 10. A group of base transceiver stations (BTS) 12a–c are positioned in predetermined locations to provide cellular service to a mobile station (MS) 14 over a given area of cells 16a–c. Each BTS 12a–c contain the same protocol and frequency band of transceiver radios to communicate with the same type of MS 14. In a conventional network, for example, the communication between the BTS 12a and MS 14 is in a single frequency band such as a 900 Mhz frequency band. The communication between the BTS 12a and MS 14 includes both voice/data information and control information. The BTS 12a–c are coupled via cables to a base station controller (BSC) 20.

The communication between the BTS 12a–c and BSC 20 includes both voice/data information and control information including a traffic channel, in one embodiment, at 16 or 64 kbit/s carrying speech or data of one radio traffic channel, and a signaling channel at 16 or 64 kbit/s carrying signaling/control information. In GSM the protocol of the signaling/control information is called an Abis link protocol that serves to associate the correct control information with the correct MS 14. This control link is broken down into three logical links for each terminal equipment including a radio signaling link (RSL) used for supporting traffic management procedures, an operations and maintenance link (OML) used for supporting network management procedures, and a layer 2 management link (L2ML) used for transferring layer 2 management messages to a transceiver (TRX) or to the base station control functions (BCF).

The Abis link protocol provides this information to support the radio resource management in the BTS. The basic communications between the BTS and BSC are based on the known cell structures and the transition of MS 14 from one cell to another. Additional complexities of radio resource management are introduced with sectorized cells, where additional radios are positioned in the BTS to cover specific geographical sectors. In this configuration, the BCF and Abis link must distinguish between radios in the same BTS but having different geographic coverage.

FIGS. 2A–B depict conventional geographically sectorized cells. This requires additional transceivers in each BTS, but also increases the service capacity. These cells are designed using multiple transceivers and antennas to communicate with specific geographical sectors within a given cell. FIG. 2A, for example, is a two-sector BTS and cell where sector 16a1 provides service to MS in angles 1–180 and sector 16a2 provides service to MS in angles 181–360. This configuration requires at least two transceivers, each one servicing one of the sectors. FIG. 2B, for example, is a three-sector BTS and cell where sector 16a1 provides service to MS in angles 1–120, sector 16a2 provides service to MS in angles 121–240 and sector 16a3 provides service to MS in angles 241–360. This configuration requires at least three transceivers, each one servicing one of the sectors.

The initialization of the conventional network is also important. The BTS 12a receives instructions from the BSC 20 to instruct the BTS 12a how to set up the base station control functions (BCF). These functions include instructions for each transceiver including what frequency sequence to use, which sector to service and how to service each MS that initiates a call with an off hook signal. Moreover the BCF is responsible for the Abis protocol link that serves to communicate the voice/data and control information between the BTS and BSC.

Figure 3:
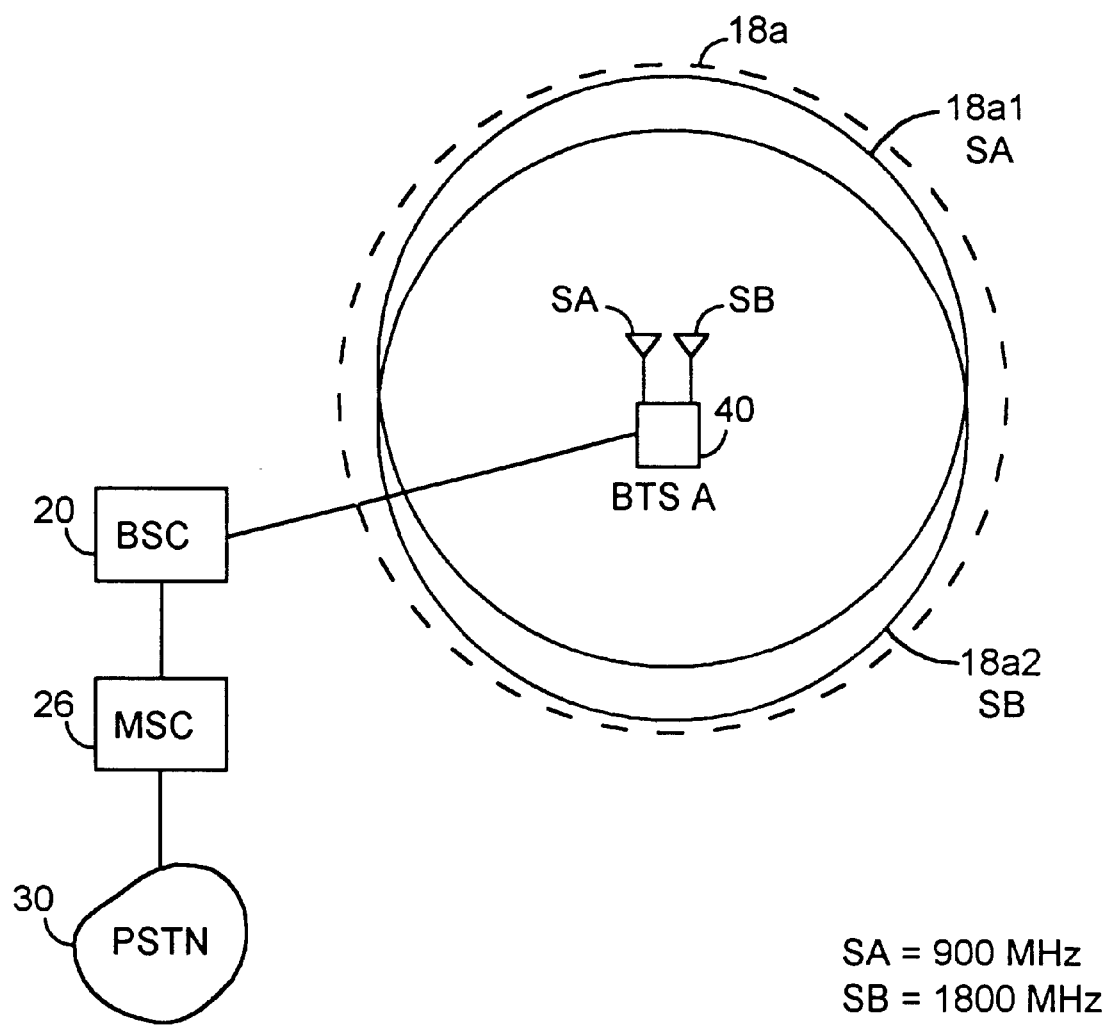
FIG. 3 depicts a frequency band sectorized base transceiver station according to an embodiment of the invention.

FIG. 3 depicts a frequency band sectorization according to an embodiment of the invention. Instead of the geographical sectors of FIGS. 2A–B, the invention employs frequency band sectors in a cell 18a. The frequency sectors employ the same geographical space as one another, but operate on different frequency bands. In this embodiment, sector 18a1 represents a 900 Mhz frequency band and sector 18a2 represents an 1800 Mhz frequency band. When a 900 Mhz frequency band MS is in the cell, the MS communicates with the BTS 40 over the 900 Mhz frequency band. When an 1800 Mhz frequency band MS is in the cell, the MS communicates with the BTS 40 over the 1800 Mhz frequency band. The internal structure of the BTS 40 according to an embodiment of the invention is now described.

B. BTS

Figure 4:
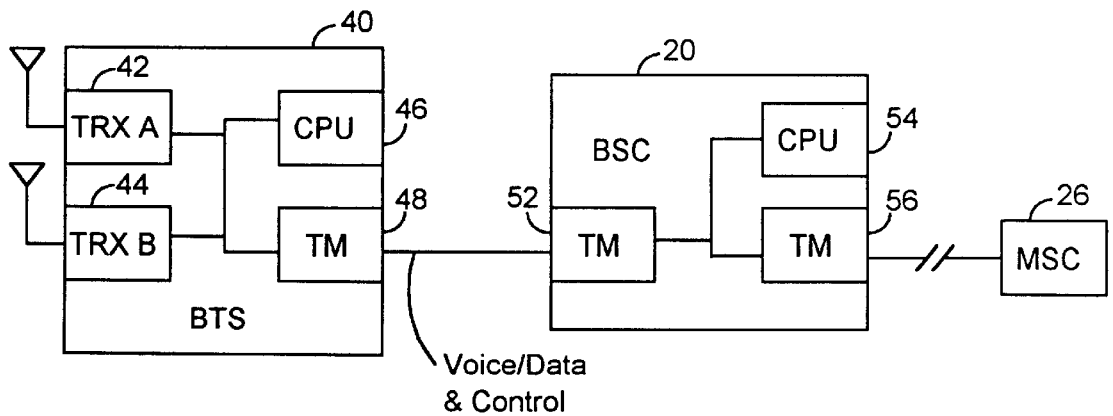
FIG. 4 depicts a base transceiver station and base station controller according to an embodiment of the invention.

FIG. 4 depicts the internal structure of the BTS 40 according to an embodiment of the invention. A chassis 40 includes a first transceiver (TRXA) 42 configured to communicate on the 900 Mhz frequency band. A second transceiver (TRXB) 44 is configured to communicate on the 1800 Mhz frequency band. These transceivers serve as the basis to communicate over the radio frequency (RF) link with any MS in the cell 18a. In other embodiments, additional transceivers are included within the chassis 40 such as extra 900 Mhz or 1800 Mhz transceivers, and one or more 1900 Mhz transceivers or other transceivers.

Conventional radio frequency communication is used between the BTS and MS. An aspect of the invention is that the MS does not notice any difference between the inventive base station and the conventional base stations depicted in FIG. 1. The BTS, however, recognizes each type of MS and communicates with that type of MS in order to service the call. From the perspective of the BTS, outbound information is transmitted to the MS and inbound information is received from the MS. The inbound information includes conventional inbound voice/data information and inbound control information. The control information includes frame numbers and counts. The outbound information includes conventional outbound voice/data information and outbound control information.

A central processing unit (CPU) 46 is coupled to the transceivers 42 and 44 and is configured to process the inbound information and outbound information associated with the MS in the cell 18a. The CPU further provides all the instructions to the transceivers in order to initialize the transceivers. The CPU performs what are called the base station control functions (BCF).

A trunk module 48 is coupled to the transceivers 42, 44 and the CPU 46 and is configured to communicate the inbound information and the outbound information with the BSC 20. The BSC has a trunk module 52 that is configured to communicate inbound information and outbound information with the BTS 40. The BSC has a central processor unit (CPU) 54 that is coupled to the trunk module 52, and to a second trunk module 56 and configured to communicate with the mobile services switching center (MSC) 26, illustrated in FIG. 3. The BSC CPU 54 communicates voice/data information and control information with the BTS CPU 46 over the Abis protocol link between the BSC and BTS. The Abis link provides the radio resource instructions necessary for initialization and ongoing voice/data information and control information transfer.

In conventional cellular systems, the Abis link is capable of carrying the instructions to instruct the BTS to configure itself with the geographical sectors 16a–c illustrated in FIGS. 2A–B. In the invention, the Abis link is capable of carrying the instructions to instruct the BTS to configure itself with the frequency band sectors 18a–b illustrated in FIG. 3. The frequency band sectors, however, are more difficult to initialize because the conventional radio resource management controls are not designed to accommodate this type of arrangement. Therefore, the invention provides an initialization that creates a BCF that can control the transceivers in order to effectively communicate with a plurality of mobile stations on different frequency bands. The initialization procedure provides the configuration parameters that determines the transmission frequency, for example, whether the TRX uses 900 MHz or 1800 MHz frequency bands. In addition to the RF channel, the configuration parameters also specify the power level. In a time domain multiplexed embodiment, the initialization commands further specify which time slots each TRX will use. In GSM, each RF frequency consists of eight TDM time slots. These time slots are also referred to as channels.

Figure 5:
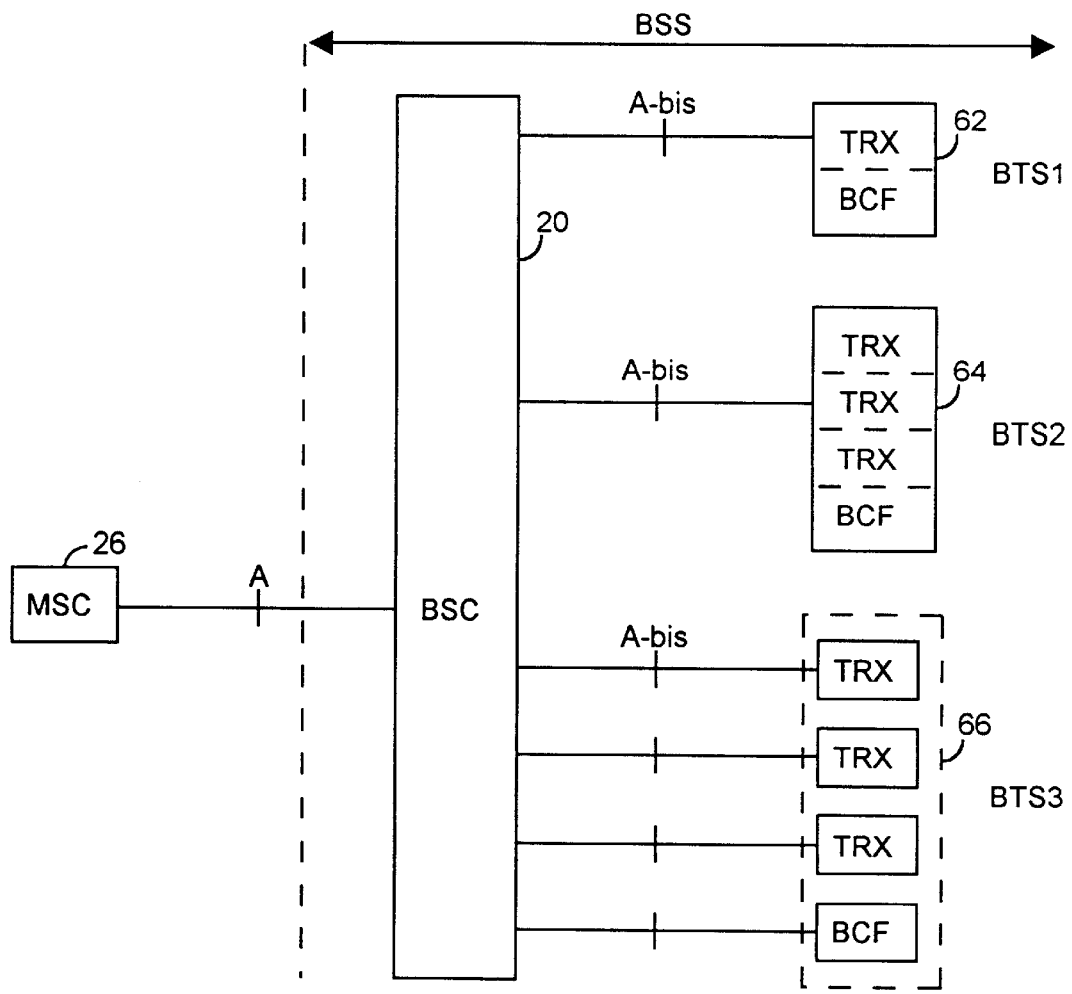
FIG. 5 depicts the control traffic between a base transceiver station and a base station controller according to embodiments of the invention.

FIG. 5 depicts various configurations for the BSC/BTS Abis protocol link. In one example, a single TRX BTS 62 includes a single TRX and a BCF to control the TRX. In another example, a three TRX BTS 64 includes three TRXs and a BCF to control the TRXs. In yet another example, a multiple TRX BTS 66 includes a plurality of TRXs each controlled by the BSC 20 over a separate Abis link. In any of these BTS configurations 62, 64, 66, the BSC provides control information to the BCF in the BTS. In the invention, the BCF controls the TRXs for frequency band sectorization. The wireless co-tenant base station of the present invention can be employed with any of these physical configurations.

In an embodiment which uses a single Abis link for more than one TRX, as shown with BTS 64 in FIG. 5, time domain multiplexing can be used to couple the TRX signals to the Abis link. Each Abis interface has 30 time slots. In one embodiment, each TRX only uses two time slots. For example, in GSM there are eight RF time slots. Each RF time slot uses only 16K of the Abis, however, each time slot on the Abis interface has a 64K capacity. Therefore, each TRX only uses a portion of the 64K Abis interface capacity. If additional TRXs are desired to be added, one the 64K Abis interface capacity is exceeded, additional Abis links are established to meet the capacity requirements.

In the BTS 64 embodiment, each TRX includes a FIFO memory. The BCF controls the TRX's by writing commands to the TRX's FIFO memory. The BCF sends the commands to the TRX's over a system bus.

Figure 6:
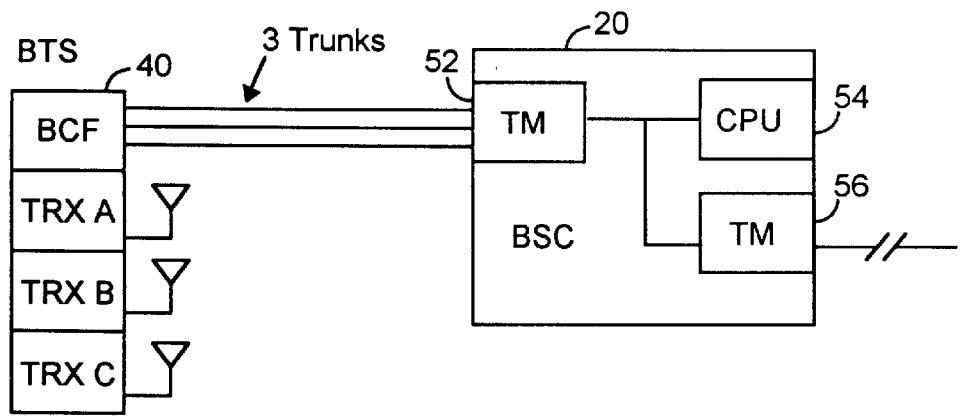
FIG. 6 depicts a base transceiver station and base station controller according to an alternate embodiment of the invention.
Figure 7A:
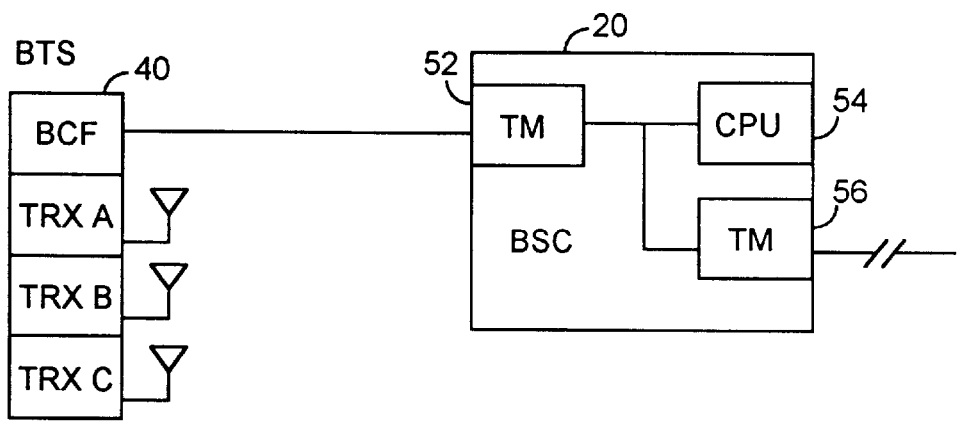
FIGS. 7A–B depict a base transceiver station and base station controller according to an alternate embodiment of the invention.
Figure 7B:
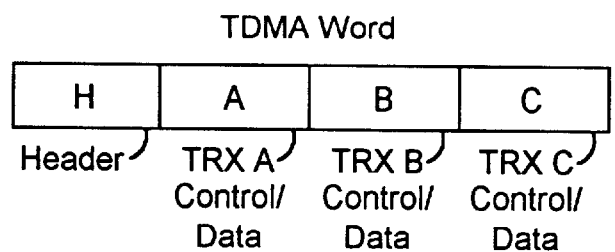

Additional embodiments of a base transceiver station and base station controller are shown in FIGS. 6 and 7A–B. FIG. 6 shows that additional trunks can be employed between the BTS and the BSC in order to handle each of the TRXs respectively. FIGS. 7A–B show that the communication between the BTS and BSC can be performed using a time division multiple access (TDMA) technique where each TRX is allocated a time slot and the BCF places respective control/data information in each respective time slot and transfers the TDMA word to the BSC.

C. CONCLUSION

Advantages of the invention include the ability to incorporate multiple transceivers communicating over multiple frequency bands in a single BTS. This allows easier placement of the various transceivers in a single location and improves cellular service to mobile stations.

Having disclosed exemplary embodiments and the best mode, modifications and variations may be made to the disclosed embodiments while remaining within the scope of the invention as defined by the following claims.

What is claimed is:

1. A base transceiver station (BTS) comprising:
   a first transceiver configured to communicate, in a geographic cell, with a first mobile station;
   a second transceiver configured to communicate, in the geographic cell, with a second mobile station;
   a processor coupled to the first transceiver and the second transceiver, the processor configured to perform functions including configuring the first transceiver to communicate with the first mobile station over a first frequency band and configuring the second transceiver to communicate with the second mobile station over a second frequency band;
   a trunk module coupled to the first transceiver, the second transceiver and the processor, the trunk module configured to communicate voice/data information and control information with a base station controller (BSC) over an Abis link; and
   a chassis enclosing the first transceiver, second transceiver, processor and trunk module.

2. The BTS of claim 1, wherein:
   the voice/data information and control information comprises first information including first voice/data information and first control information, and second information including second voice/data information and second control information; and
   wherein the processor is configured to multiplex the first information and the second information communicated via the trunk module with the BSC.

3. The BTS of claim 2, wherein the first control information and the second control information include Abis information allocating an Abis protocol time slot to each of the first and second transceivers.

4. The BTS of claim 1 further comprising:
   a third transceiver configured to communicate with a third mobile station in the geographic cell; and
   wherein the processor is coupled to the third transceiver and configured to instruct the third transceiver to communicate with the third mobile station over a third frequency band.

5. The BTS of claim 4, wherein the voice/data information and control information comprises:
   first information including first voice/data information and first control information;
   second information including second voice/data information and second control information; and
   third information including third voice/data information and third control information; and
   wherein the processor is configured to multiplex the first information, the second information and the third information communicated via the trunk module with the BSC.

6. The BTS of claim 5, wherein the first control information, the second control information, and the third control information include Abis information allocating an Abis protocol time slot to each of the first and second transceivers.

7. A cellular network including the BTS of claim 1, said cellular network further comprising a base station controller (BSC) for communicating with the BTS, the BSC having:
   a second trunk module configured to communicate with the BTS;
   a third trunk module configured to communicate with a mobile services switching center (MSC); and
   a second processor configured to perform functions including to communicate voice/data information and control information with the BTS.

8. The BTS of claim 1, wherein the processor is further configured to perform functions including configuring the first and second transceivers to operate at specified power levels.

9. The BTS of claim 1, further comprising additional transceivers in the chassis and wherein the processor and the trunk module are configured to communicate voice/data information and control information for the additional transceivers with the BSC over an additional Abis link.

10. The BTS of claim 1, wherein the first and second transceivers include first-in-first-out memories, and wherein the first processor configures the first and second transceivers by writing commands to the first-in-first-out memories.

11. A base station controller (BSC) for communicating with a base transceiver station (BTS) having enclosed within a single chassis a plurality of transceivers, a first processor coupled to the plurality of transceivers, and a first trunk module coupled to the first processor and to the plurality of transceivers, the BSC comprising:

a second trunk module coupled to the first trunk module over an Abis link, the second trunk module configured to communicate voice/data information and control information with the BTS;

a second processor coupled to the second trunk module, the second processor configured to perform functions including communicating the voice/data information and control information with the BTS over the Abis link; and wherein the control information includes information instructing the BTS to configure each of the plurality of transceivers to operate in a specified frequency band sector to communicate with at least one of a plurality of mobile stations in a geographic cell in a different frequency band sector.

12. The BSC claim 11, wherein the control information communicated from the second processor to the BTS over the Abis link includes information instructing the BTS to configure each of the plurality of transceivers to operate at specified power level.

13. The BSC claim 11, wherein the Abis link is a multiplexed Abis link, and wherein the control information communicated from the second processor to the BTS over the Abis link includes information allocating an Abis protocol time slot to each of the plurality of transceivers.

14. A cellular network comprising:

a base transceiver station (BTS) for communicating with a first mobile station on a first frequency band and a second mobile station on a second frequency band, the BTS including:

a first transceiver configured to communicate, in a geographic cell, with the first mobile station over the first frequency band;

a second transceiver configured to communicate, in the geographic cell, with the second mobile station over the second frequency band;

a processor coupled to the first transceiver and the second transceiver, the processor configured to perform functions including configuring the first transceiver to communicate with the first mobile station and configuring the second transceiver to communicate with the second mobile station, a first trunk module coupled to the processor and to the first and second transceivers; and a chassis enclosing the first transceiver, second transceiver, processor and first trunk module; and a base station controller (BSC) for communicating with the BTS, the BSC including:

a second trunk module coupled to the first trunk module over an Abis link, the second trunk module configured to communicate voice/data information and control information with the BTS; and a second processor coupled to the second trunk module, the second processor configured to perform functions including communicating the voice/data information and control information with the BTS over the Abis link.

15. The cellular network of claim 14, wherein the control information communicated from the second processor to the BTS over the Abis link includes information instructing the BTS to configure each of the first and second transceivers to operate in at specified power level.

16. The cellular network of claim 14, wherein the Abis link is a multiplexed Abis link, and wherein the control information communicated from the second processor to the BTS over the Abis link includes information allocating an Abis protocol time slot to each of the first and second transceivers.

17. The cellular network of claim 16, further comprising additional transceivers in the BTS, and wherein the control information communicated from the second processor to the BTS over the multiplexed Abis link includes information allocating an Abis protocol time slot to each of the transceivers.

18. The cellular network of claim 16, further comprising additional transceivers in the BTS and an additional multiplexed Abis link to couple control information for the additional transceivers from the second processor to the BTS.

19. The cellular network of claim 14, wherein the first and second transceivers include first-in-first-out memories, and wherein the first processor configures the first and second transceivers by writing commands to the first-in-first-out memories.

\* \* \* \* \*